United States Patent
Xu et al.

(10) Patent No.: US 12,184,567 B2
(45) Date of Patent: Dec. 31, 2024

(54) DATA TRANSMISSION METHOD, NETWORK DEVICE, AND TERMINAL DEVICE

(71) Applicant: Huawei Technologies Co., Ltd., Guangdong (CN)

(72) Inventors: Xiuqiang Xu, Shanghai (CN); Yan Chen, Ottawa (CA); Liqing Zhang, Ottawa (CA); Yi Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/315,742

(22) Filed: May 11, 2023

(65) Prior Publication Data

US 2023/0361950 A1 Nov. 9, 2023

Related U.S. Application Data

(63) Continuation of application No. 17/153,245, filed on Jan. 20, 2021, now Pat. No. 11,683,134, which is a (Continued)

(30) Foreign Application Priority Data

Jan. 5, 2017 (CN) .......................... 201710008469.3

(51) Int. Cl.
*H04L 5/00* (2006.01)
*H04W 72/044* (2023.01)

(52) U.S. Cl.
CPC .......... *H04L 5/0044* (2013.01); *H04L 5/0007* (2013.01); *H04W 72/044* (2013.01)

(58) Field of Classification Search
CPC ... H04L 5/0094; H04L 5/0044; H04L 5/0007; H04W 74/08; H04W 72/044
See application file for complete search history.

(56) References Cited

U.S. PATENT DOCUMENTS

| | | |
|---|---|---|
| 2008/0031453 A1 | 2/2008 | Pedersen |
| 2008/0080472 A1 | 4/2008 | Bertrand et al. |
| | (Continued) | |

FOREIGN PATENT DOCUMENTS

| | | |
|---|---|---|
| CN | 1398119 A | 2/2003 |
| CN | 102089996 A | 6/2011 |
| | (Continued) | |

OTHER PUBLICATIONS

InterDigital Communications, R1-1612311, Random Access Procedure, 3GPP TSG RAN WG1 #87, 3GPP server publication date (Nov. 5, 2016), total 4 pages.

(Continued)

*Primary Examiner* — Chi Ho A Lee
(74) *Attorney, Agent, or Firm* — WOMBLE BOND DICKINSON (US) LLP (57) ABSTRACT

Embodiments of this application provide a data transmission method, a network device, and a terminal device. The method may include detecting, by a network device, a first signal in an uplink signal. The method may also include determining, by the network device, a signal structure of the uplink signal based on a result of detecting the first signal. Furthermore, the method may include receiving, by the network device, the uplink signal based on the signal structure, and/or responding to the uplink signal based on the signal structure. According to the data transmission method in the embodiments of this application, before receiving data, the network device can determine the signal structure, used by the terminal device, of the uplink signal, and then use a corresponding receiving method to avoid complexity and a reliability risk that are caused by completely blind detection performed by the network device.

9 Claims, 5 Drawing Sheets

Related U.S. Application Data continuation of application No. 16/460,892, filed on Jul. 2, 2019, now Pat. No. 10,931,416, which is a continuation of application No. PCT/CN2017/118913, filed on Dec. 27, 2017.

(56) References Cited

U.S. PATENT DOCUMENTS

| | | |
|---|---|---|
| 2010/0188982 A1 | 7/2010 | Kato et al. |
| 2011/0194432 A1* | 8/2011 | Kato .................. H04W 74/002 370/252 |
| 2011/0317597 A1 | 12/2011 | Wan et al. |
| 2012/0093102 A1 | 4/2012 | Zhang et al. |
| 2012/0236765 A1 | 9/2012 | Huang |
| 2013/0294363 A1 | 11/2013 | Feng et al. |
| 2013/0301611 A1 | 11/2013 | Baghel et al. |
| 2013/0315358 A1 | 11/2013 | Krishnamurthy et al. |
| 2014/0079011 A1 | 3/2014 | Wiberg et al. |
| 2014/0133430 A1 | 5/2014 | Yang et al. |
| 2014/0169260 A1 | 6/2014 | Nishio et al. |
| 2014/0341145 A1 | 11/2014 | Nakashima et al. |
| 2015/0078335 A1 | 3/2015 | Sivanesan et al. |
| 2015/0092528 A1 | 4/2015 | Luo et al. |
| 2015/0244449 A1 | 8/2015 | Frenger et al. |
| 2015/0289292 A1* | 10/2015 | Sun .................... H04L 27/2646 370/329 |
| 2016/0234858 A1 | 8/2016 | Bao et al. |
| 2016/0249259 A1 | 8/2016 | Park et al. |
| 2017/0289924 A1 | 10/2017 | Fu et al. |
| 2017/0331639 A1 | 11/2017 | Quan et al. |
| 2018/0124621 A1 | 5/2018 | Jung et al. |
| 2018/0220466 A1 | 8/2018 | Park et al. |
| 2019/0090249 A1 | 3/2019 | Han et al. |
| 2019/0104551 A1 | 4/2019 | Deenoo et al. |
| 2019/0174513 A1 | 6/2019 | Loehr et al. |
| 2019/0182833 A1 | 6/2019 | Li et al. |
| 2019/0261287 A1 | 8/2019 | Deenoo et al. |
| 2019/0274161 A1 | 9/2019 | Nakao |
| 2019/0281635 A1 | 9/2019 | Kwak et al. |
| 2019/0289592 A1 | 9/2019 | Lee et al. |
| 2019/0387548 A1 | 12/2019 | Kim |

FOREIGN PATENT DOCUMENTS

| | | |
|---|---|---|
| CN | 102300331 A | 12/2011 |
| CN | 102378302 A | 3/2012 |
| CN | 102447546 A | 5/2012 |
| CN | 104797007 A | 7/2015 |
| CN | 105992353 A | 10/2016 |
| WO | 2010102450 A1 | 9/2010 |
| WO | 2013051413 A1 | 4/2013 |
| WO | 2015129985 A1 | 9/2015 |
| WO | 2016119228 A1 | 8/2016 |
| WO | 2016134526 A1 | 9/2016 |
| WO | 2016141461 A1 | 9/2016 |

OTHER PUBLICATIONS

ZTE, ZTE Microelectronics, Considerations on the Preamble Design for Grant-free Non-orthogonal MA. 3GPP TSG RAN WG1 Meeting #86bis Lisbon, Portugal, Oct. 10-14, 2016, R1-1608955, 5 pages.

Intel Corporation, Grant-free UL transmissions in NR. 3GPP TSG-RAN WG1 #86bis Lisbon, Portugal, Oct. 10-14, 2016, R1-1609499, 8 pages.

Ericsson, Narrowband IoT Random Access Design. 3GPP TSG-RAN1 #83 Nov. 15-22, 2015, Anaheim, US, R1-157424, 10 pages.

Nokia, Alcatel-Lucent Shanghai Bell, Grant-free to grant-based switching for URLLC. 3GPP TSG-RAN WG1 #87 Reno, USA, Nov. 14-18, 2016, R1-1612253, 3 pages.

Motorola, Synchronized Random Access Channel Design. 3GPP TSG RAN1#45, Shanghai, China, May 8-May 12, 2006, R1-061167, 3 pages.

Texas Instruments, Non synchronized Random Access structure and performance for E-UTRA. 3GPP TSG RAN WG1 L TE Ad Hoc, Cannes, France, Jun. 27-30, 2006, R1-061749, 14 pages.

* cited by examiner

DATA TRANSMISSION METHOD, NETWORK DEVICE, AND TERMINAL DEVICE

CROSS-REFERENCE TO RELATED APPLICATIONS

This application is a continuation of U.S. patent application Ser. No. 17/153,245, filed on Jan. 20, 2021, now U.S. Pat. No. 11,683,134, which is a continuation of U.S. patent application Ser. No. 16/460,892, filed on Jul. 2, 2019, now U.S. Pat. No. 10,931,416, which is a continuation of International Application No. PCT/CN2017/118913, filed on Dec. 27, 2017, which claims priority to Chinese Patent Application No. 201710008469.3, filed on Jan. 5, 2017. All of the afore-mentioned patent applications are hereby incorporated by reference in their entireties.

TECHNICAL FIELD

Embodiments of this application relate to the communications field, and more specifically, to a data transmission method, a network device, and a terminal device.

BACKGROUND

A request and dynamic grant-based method is usually used to transmit uplink data in a long term evolution (LTE) system. Specifically, when a data packet needs to be sent, a terminal device sends a scheduling request to a base station, to request, from the base station, a resource used for sending an uplink data packet, a modulation and coding scheme (MCS) for use, and the like. After receiving the scheduling request, if the base station allows the terminal device to send the uplink data packet, the base station generates grant information and sends the grant information to the terminal device, where the grant information is used to inform the terminal device of information such as the resource used for sending the data packet. After receiving the grant information, the terminal device sends the data packet based on an indication of the grant information.

However, with regard to sending of a small data packet, for example, small-packet services in a massive machine type communications (mMTC) scenario and an enhanced mobile broadband (eMBB) scenario that are in a 5G system, delay and signaling overheads are excessively large when the request and dynamic grant-based data transmission method is used, reducing system efficiency.

To resolve the foregoing problem, a grant-free transmission method is used by some systems for a scenario of small packet transmission with obvious periodicity. Specifically, the base station sends grant information to the terminal device only once. In a subsequent uplink transmission opportunity (such as a subframe), when there is a data packet, the terminal device sends the data packet by using the grant information. In this way, control signaling overheads can be significantly reduced.

However, when the terminal device transmits uplink data by using the grant-free transmission method, the terminal device and the base station need to be in an uplink synchronized state. To be specific, when the terminal device is in an idle mode or loses uplink synchronization, before transmitting data by using the grant-free transmission method, the terminal device first needs to implement uplink synchronization with the base station through a random access procedure, and then the terminal device can send the uplink data by using the grant-free transmission method. Consequently, a delay and signaling overheads are still relatively large.

SUMMARY

Embodiments of this application provide a data transmission method, a network device, and a terminal device, to reduce delay and signaling overheads.

According to a first aspect, an information transmission method is provided, including:
 detecting, by a network device, a first signal in an uplink signal;
 determining, by the network device, a signal structure of the uplink signal based on a result of detecting the first signal; and
 receiving, by the network device, the uplink signal based on the signal structure, and/or responding to the uplink signal based on the signal structure.

In this embodiment of this application, before demodulating data, the network device can determine the signal structure, used by a terminal device, of the uplink signal, and then use a corresponding receiving method. This avoids complexity and a reliability risk that are caused by completely blind detection performed by the network device, and can effectively reduce delay and signaling overheads.

Further, in some possible embodiments, if the network device finds the first signal,
 the determining, by the network device, a signal structure of the uplink signal based on a result of detecting the first signal includes:
 determining, by the network device, the signal structure based on first mapping relationship information and the first signal, where the first mapping relationship information includes: a correspondence between the first signal and the signal structure, and/or a correspondence between a resource used for transmitting the first signal and the signal structure.

In some possible embodiments, the determining, by the network device, the signal structure based on first mapping relationship information and the first signal includes:
 determining, by the network device based on the first mapping relationship information and the first signal, that the uplink signal includes only the first signal; and
 the receiving, by the network device, the uplink signal based on the signal structure, and/or responding to the uplink signal based on the signal structure includes:
 sending, by the network device, a response message to a terminal device, where the response message includes feedback information of the first signal.

Further, in some possible embodiments, before the receiving, by the network device, the uplink signal based on the signal structure, and/or responding to the uplink signal based on the signal structure, the method further includes:
 determining, by the network device, a second signal based on second mapping relationship information and the first signal, where the second mapping relationship information includes:
 a correspondence between the second signal and the first signal, and a correspondence between the first signal and at least one of a third signal, attribute information of first data, and attribute information of second data.

In this embodiment of this application, the network device can determine the second signal, and/or the third signal, and/or the second data based on a mapping relationship, and receive the first data and/or the second data by using the second signal and/or the third signal. This further reduces complexity for the network device, reduces a delay, and improves reliability.

Further, in some possible embodiments, the determining, by the network device, the signal structure based on first mapping relationship information and the first signal includes:

determining, by the network device based on the first mapping relationship information, the second mapping relationship information, and the first signal, that the uplink signal includes:
the first signal, the second signal, the third signal, and the first data; and
the receiving, by the network device, the uplink signal based on the signal structure, and/or responding to the uplink signal based on the signal structure includes:
determining, by the network device, the third signal and the attribute information of the first data based on the second mapping relationship information and the first signal; receiving, by the network device, the first data based on the second signal, the third signal, and the attribute information of the first data; and sending, by the network device, a response message to a terminal device, where the response message includes feedback information of the first signal and feedback information of the first data.

Further, in some possible embodiments, the determining, by the network device, the signal structure based on first mapping relationship information and the first signal includes:

determining, by the network device based on the first mapping relationship information and the first signal, that the uplink signal includes:
the first signal, the second signal, and the second data; and
the receiving, by the network device, the uplink signal based on the signal structure, and/or responding to the uplink signal based on the signal structure includes:
receiving, by the network device, the second data based on the second signal; and sending, by the network device, a response message to a terminal device, where the response message includes feedback information of the first signal.

In some possible embodiments, if the network device finds no first signal, the determining, by the network device, a signal structure of the uplink signal based on a result of detecting the first signal includes:

determining, by the network device, that the uplink signal includes:
a second signal, a third signal, and first data; and
the receiving, by the network device, the uplink signal based on the signal structure, and/or responding to the uplink signal based on the signal structure includes:
determining, by the network device, the second signal and the third signal based on third mapping relationship information; receiving, by the network device, the first data based on the second signal and the third signal; and sending, by the network device, a response message to a terminal device, where the response message includes feedback information of the first data.

In this embodiment of this application, the network device can determine the second signal based on the third mapping relationship information, and receive the second data by using the second signal. This further reduces complexity for the network device, reduces a delay, and improves reliability.

According to a second aspect, a data transmission method is provided, including:

determining, by a terminal device, a signal structure of an uplink signal based on an uplink status and a type of target data; and
sending, by the terminal device, the uplink signal based on first mapping relationship information and the signal structure of the uplink signal.

According to the data transmission method in this embodiment of this application, when the terminal device is to transmit data, the terminal device can determine the signal structure of the uplink signal based on the type of the data and the synchronization status, and transmit the uplink data based on the structure of the uplink transmission signal. This can effectively reduce a delay and signaling overheads.

In some possible embodiments, the uplink status is an uplink out-of-synchronization state.

Further, in some possible embodiments, the target data is empty; and
the determining, by a terminal device, a signal structure of an uplink signal based on an uplink status and a type of target data includes:
determining, by the terminal device based on the first mapping relationship information, that the uplink signal includes only the first signal.

Further, in some possible embodiments, before the sending, by the terminal device, the uplink signal based on first mapping relationship information and the signal structure of the uplink signal, the method further includes:
determining, by the terminal device, a second signal based on second mapping relationship information and the first signal, where
the second mapping relationship information includes:
a correspondence between the second signal and the first signal, and a correspondence between the first signal and at least one of a third signal, attribute information of first data, and attribute information of second data.

Further, in some possible embodiments, the target data is application-layer data; and the determining, by a terminal device, a signal structure of an uplink signal based on an uplink status and a type of target data includes:
determining, by the terminal device based on the first mapping relationship information and the second mapping relationship information, that the uplink signal includes:
the first signal, the second signal, the third signal, and the first data.

Further, in some possible embodiments, the target data is non-application-layer data; and
the determining, by a terminal device, a signal structure of an uplink signal based on an uplink status and a type of target data includes:
determining, by the terminal device based on the first mapping relationship information and the second mapping relationship information, that the uplink signal includes:
the first signal, the second signal, and the second data.

In some possible embodiments, the uplink status is an uplink synchronized state, and the target data is application-layer data; and
the determining, by a terminal device, a signal structure of an uplink signal based on an uplink status and a type of target data includes:
determining, by the terminal device based on third mapping relationship information, that the uplink signal includes:
a second signal, a third signal, and first data.

According to a third aspect, a network device is provided, including:

a detection unit, configured to detect a first signal in an uplink signal;

a processing unit, configured to determine a signal structure of the uplink signal based on a result of detecting the first signal; and a transceiver unit, configured to receive the uplink signal based on the signal structure, and/or respond to the uplink signal based on the signal structure.

The network device in the third aspect can implement the data transmission method performed by the network device in the method in the first aspect.

According to a fourth aspect, a network device is provided, including:

a processor, configured to: detect a first signal in an uplink signal, and determine a signal structure of the uplink signal based on a result of detecting the first signal; and a transceiver, configured to receive the uplink signal based on the signal structure, and/or respond to the uplink signal based on the signal structure.

The network device in the fourth aspect can implement the data transmission method performed by the network device in the method in the first aspect.

According to a fifth aspect, a terminal device is provided, including:

a processing unit, configured to determine a signal structure of an uplink signal based on an uplink status and a type of target data; and a transceiver unit, configured to send the uplink signal based on first mapping relationship information and the signal structure of the uplink signal.

The terminal device in the fifth aspect can implement the data transmission method performed by the terminal device in the method in the second aspect.

According to a sixth aspect, a terminal device is provided, including:

a processor, configured to determine a signal structure of an uplink signal based on an uplink status and a type of target data; and a transceiver, configured to send the uplink signal based on first mapping relationship information and the signal structure of the uplink signal.

The terminal device in the sixth aspect can implement the data transmission method performed by the terminal device in the method in the second aspect.

With reference to the foregoing aspects, in some possible embodiments, the third mapping relationship information includes a correspondence between the attribute information of the first data, the second signal, and the third signal.

With reference to the foregoing aspects, in some possible embodiments, the third mapping relationship information includes the correspondence between the attribute information of the first data, the second signal, and the third signal.

With reference to the foregoing aspects, in some possible designs, the attribute information includes:

at least one of a cyclic prefix length of an orthogonal frequency division multiplexing (OFDM) symbol, an OFDM symbol resource, and a modulation and coding scheme (MCS).

With reference to the foregoing aspects, in some possible embodiments, the first signal is used for uplink synchronization between the terminal device and the network device, and the third signal is used to estimate an uplink channel between the terminal device and the network device.

With reference to the foregoing aspects, in some possible embodiments, the response message further includes feedback information of the second data.

DESCRIPTION OF EMBODIMENTS

Random access is a necessary process for establishing a radio link between user equipment (UE) and a network. Only after the UE implements uplink synchronization with a base station (NodeB, NB) through the random access procedure can the UE be scheduled by the base station to transmit uplink data.

At present, based on different service triggering manners, random access may be classified into contention based random access and non-contention based random access.

When the NodeB does not know a service or a state of the UE, but the UE needs to apply for an uplink resource or an uplink timing advance (TA) for synchronization, the UE needs to initiate contention based random access. An example of a contention based random access procedure is: The UE sends, to the NodeB, a random access preamble sequence that is randomly selected; the NodeB sends a random access response message to the UE, to inform the UE of information about an uplink resource that can be used; after receiving the random access response, the UE sends a scheduling message on the uplink resource specified in the random access response message, where the scheduling message includes information about a unique identifier of the UE; and after receiving a request, the NodeB sends a contention resolution result to the UE, to complete the random access procedure.

For example, the UE performs initial access. In this case, a state of a radio resource control (RRC) layer is a radio resource control idle (RRC IDLE) mode. For another example, the UE performs reestablishment when a radio link is torn down. For still another example, the UE is to send uplink data, but it is found that uplink synchronization is lost or there is no uplink scheduling request (SR) resource. For yet another example, the UE needs to receive new downlink data, and then transmit acknowledgement/negative acknowledgement (ACK/NACK) information over an uplink, but finds that uplink synchronization is lost. In this case, because the NodeB does not know a service or a state of the UE, the UE needs to initiate contention based random access.

In non-contention based random access, the NodeB informs the UE of a preamble sequence and a resource that are to be used. An example of non-contention based random access procedure is: The NodeB sends indication information of a random access preamble sequence to the UE; the UE sends the specified random access preamble sequence to the NodeB; and the NodeB sends a random access response to the UE, to complete the random access procedure.

For example, the UE needs to perform a cell handover. For another example, downlink synchronization is lost, but there is downlink data to be sent.

It should be noted that, when the terminal device transmits uplink data by using a grant-free transmission method, the terminal device and the NodeB need to be in an uplink synchronized state. In other words, when the terminal device transmits the uplink data by using the grant-free transmission method, the terminal device first needs to perform uplink synchronization with the NodeB through the random access procedure. Specifically, if the non-contention based random access method is used, the data can be sent only after the three-step random access procedure is performed; or if the contention based random access method is used, the data can be sent only after the four-step random access procedure is performed. Consequently, delay and signaling overheads are excessively high.

Embodiments of this application provide a data transmission method. A random access procedure and a data transmission process (grant-free transmission or request and dynamic grant-based transmission) are integrated, so that based on a synchronization status, a data sending requirement (whether data needs to be sent), and information such as a channel status, a terminal can select a proper signal structure from a plurality of uplink sending signal structures for sending.

It should be understood that technical solutions in the embodiments of this application can be applied to various communications systems, for example, a global system for mobile communications (GSM) system, a code division multiple access (CDMA) system, a wideband code division multiple access (WCDMA) system, a general packet radio service (GPRS) system, a 5G communications system, an LTE frequency division duplex (FDD) system, an LTE time division duplex (TDD) system, and a universal mobile telecommunications system (UMTS).

In this application, the embodiments are described with reference to a network device and a terminal device. The terminal device includes but is not limited to user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may communicate with one or more core networks by using a radio access network (RAN). For example, the terminal device may be a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved PLMN network.

The network device may be a device configured to communicate with the terminal device, and the network device may include a base station or a network side device having a function of a base station. For example, the network device may be a base transceiver station (BTS) in the GSM system or the CDMA system; a NodeB (NB) in the WCDMA system; an evolved NodeB (eNB or eNodeB), a relay node, or an access point in the LTE system; an in-vehicle device or a wearable device; or a network device in a future 5G network.

The following describes the technical solutions in the embodiments of this application with reference to the accompanying drawings.

Figure 1:
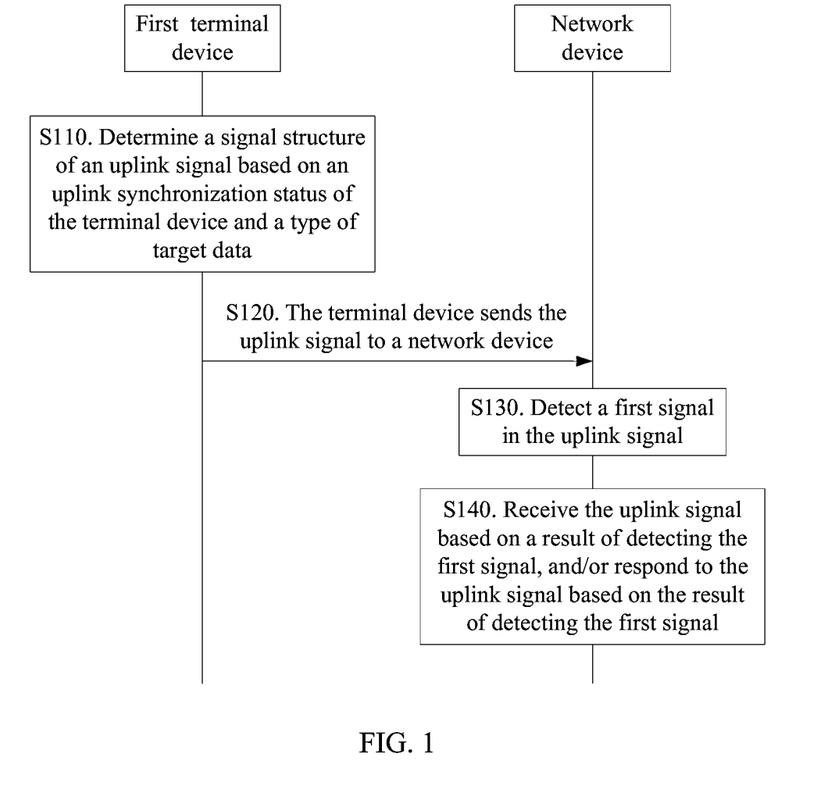
FIG. 1 is a schematic diagram of an example of a scenario according to an embodiment of this application.

FIG. 1 is a schematic flowchart of a data transmission method 100 according to an embodiment of this application. As shown in FIG. 1, the method 100 includes the following steps.

S110. A terminal device determines a signal structure of an uplink signal based on an uplink status of the terminal device and a type of target data.

Specifically, in embodiments, the terminal device may select different signal structures for uplink data transmission, based on a synchronization status of the terminal device and a specific type of data that needs to be sent. The synchronization status of the first terminal may be an uplink out-of-synchronization state or an uplink synchronized state.

In other words, when receiving the uplink data, a network device detects and receives the uplink data based on the signal structure of the uplink signal, and sends feedback information of the data.

It should be understood that the signal structure of the uplink signal in this embodiment of this application may be used to indicate a type of the signal included in the uplink data. To be specific, when the terminal device needs to send the data or feedback information of data to the network device, the terminal device may send the uplink data based on the determined signal structure of the uplink signal; and the network device determines the specific type of the signal in the uplink data of the terminal device based on the signal structure of the uplink signal.

It should also be understood that the uplink status in this embodiment of this application may be classified into an uplink synchronized state and an uplink out-of-synchronization state. Specific representation forms of the uplink synchronized state and the uplink out-of-synchronization state are not limited in this embodiment of this application. For example, the uplink out-of-synchronization state may mean that the terminal device is in an idle mode (which means that there is no Radio Resource Control connection and uplink synchronization with the base station is not implemented); or may mean that the terminal device is in a connected mode and has a Radio Resource Control connection, but loses uplink synchronization with the base station.

For ease of understanding, the following uses examples to classify and describe signals and data in uplink transmission performed by the terminal device in this embodiment of this application.

A first signal is a sequence or a signal that is used to implement uplink synchronization between the terminal device and the network device, for example, a random access preamble sequence in the LTE system. Based on a detection status of the signal, the network device may determine a synchronization parameter of the terminal, for example, a timing advance (TA).

A second signal is used by the network device when receiving data, to determine the terminal device corresponding to the data. That is, the terminal detects the signal to determine whether the terminal has sent uplink data. For example, the second signal is an identification signal or a sequence of the terminal device.

A third signal is a sequence used by the network device to estimate an uplink channel between the terminal device and the network device, for example, a pilot sequence or a demodulation reference signal (DMRS) in LTE. The network device may perform the channel estimation to demodulate data sent by the terminal.

First data is a payload that can be demodulated and received by the network device only after the network device performs channel estimation by using a third signal, for example, an application-layer data packet, a buffer status report of the terminal, a scheduling request, or identification (for example, an ID) information of the terminal device.

Second data is a signal or a sequence that can be received by the network device without performing channel estimation by using a third signal, for example, a signal or a sequence used to implement a function of a scheduling request.

It should be understood that the first signal, the second signal, the third signal, the first data, and the second data in this embodiment of this application may be signals or sequences used to implement the foregoing functions, or may be signals or sequences used to implement other functions. The protection scope of this embodiment of this application covers a logical relationship between the signals and the data, and specific functions of the signals and the data are not limited in this embodiment of this application.

It should also be understood that at least two of the first signal, the second signal, the third signal, and the second data are a same sequence or a same signal in this embodiment of this application. In other words, the terminal device may send only one signal or sequence to the network device, to implement functions of at least two of the first signal, the second signal, the third signal, and the second data that are described above. A quantity of signals and a specific representation form of the signal are not limited in this embodiment of this application.

For example, the second signal and the third signal may be a same pilot sequence.

According to the data transmission method in this embodiment of this application, when the terminal device is to transmit data, the terminal device can determine the signal structure of the uplink signal based on the type of the data and the synchronization status, and transmit the uplink data based on the structure of the uplink transmission signal. This can effectively reduce a delay and signaling overheads.

The following describes in detail signal structures of uplink signals in this embodiment of this application by using the first signal, the second signal, the third signal, the first data, and the second data as examples. Specifically, the signal structures may be classified into the following four types.

A signal structure 1 is the first signal, and is used to implement only uplink synchronization between the terminal and the network device.

A signal structure 2 includes the first signal, the second signal, the third signal, and the first data, and is used to implement uplink synchronization between the terminal and the network device and send the first data.

A signal structure 3 includes the first signal, the second signal, and the second data, and is used to implement uplink synchronization between the terminal and the network device and send the second data.

A signal structure 4 includes the second signal, the third signal, and the first data, and is used to send the first data.

Figure 2:
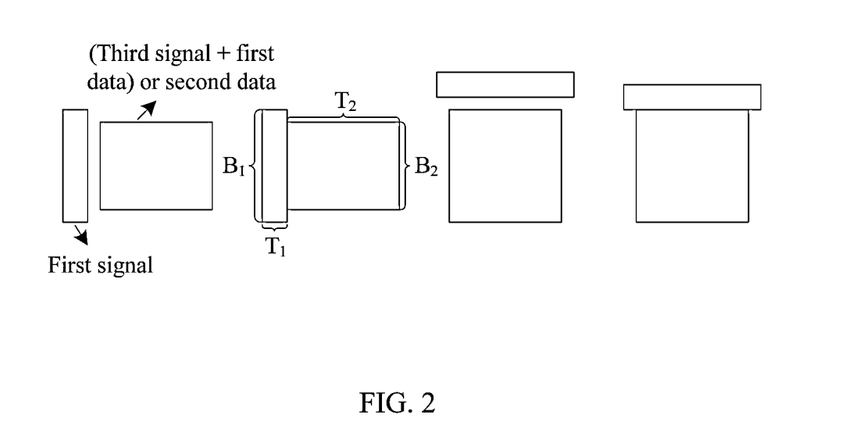
FIG. 2 is a schematic block diagram of a time-frequency resource location according to an embodiment of this application.

FIG. 2 is a schematic block diagram of a time-frequency resource used for sending a signal and/or data according to an embodiment of this application.

As shown in FIG. 2, in this embodiment of this application, time-frequency resources used for sending signals and/or data may be the same or may be different; and may be consecutive or inconsecutive in time domain, may be consecutive or inconsecutive in frequency domain, or may be consecutive or inconsecutive both in time domain and in frequency domain. B1 and B2 are used to indicate different frequency domain resources, and T1 and T2 are used to indicate different time domain resources.

For example, in the signal structure 1, a time-frequency resource used for sending the first signal may be the same as or different from a time-frequency resource used for sending the second signal and/or the third signal; and may be consecutive or inconsecutive in time domain, may be consecutive or inconsecutive in frequency domain, or may be consecutive or inconsecutive both in time domain and in frequency domain.

For another example, in the signal structure 2, a time-frequency resource used for sending the first signal and a time-frequency resource used for sending the first data may be consecutive or inconsecutive in time domain, may be consecutive or inconsecutive in frequency domain, or may be consecutive or inconsecutive both in time domain and in frequency domain.

For still another example, in the signal structure 3, a time-frequency resource used for sending the first signal and a time-frequency resource used for sending the second data may be consecutive or inconsecutive in time domain, may be consecutive or inconsecutive in frequency domain, or may be consecutive or inconsecutive both in time domain and in frequency domain.

For yet another example, in the signal structure 4, a time-frequency resource used for sending the second signal and/or the third signal and a time-frequency resource used for sending the first data may be consecutive or inconsecutive in time domain, may be consecutive or inconsecutive in frequency domain, or may be consecutive or inconsecutive both in time domain and in frequency domain.

Optionally, in this embodiment of this application, the second signal may be configured with a time-frequency resource the same as that configured for the first data. That is, the second signal is bound to the time-frequency resource for the first data, to be sent on the time-frequency resource for the first data. It should be understood that, alternatively, the second signal in this embodiment of this application may be bound to a time-frequency resource for another signal or other data, for example, the third signal, the first signal, or the second data, to be sent on the time-frequency resource for the another signal or other data.

In S110, the terminal device may determine the specific uplink transmission signal structure based on the synchronization status and the type of the data.

For example, if the terminal device is in the out-of-synchronization state and the type of the data is the first data, the structure of the uplink transmission signal may be the signal structure 1 or the signal structure 2.

For another example, if the terminal device is in the out-of-synchronization state and the type of the data is the second data, the structure of the uplink transmission signal may be the signal structure 1 or the signal structure 3.

For still another example, if the terminal device is in the synchronized state and the type of the data is the first data, the structure of the uplink transmission signal may be the signal structure 4.

For yet another example, if the terminal device is in the synchronized state and the type of the data is not the first data, no signal structure is sent.

Optionally, the terminal device may determine the synchronization status based on whether a timer times out, or the network device may inform the terminal device that a synchronization parameter needs to be obtained anew. This is not specifically limited in this embodiment of this application.

With reference to S120, S130, and S140 in the method embodiment 100, the following describes in detail embodiments of a specific implementation of uplink transmission between the terminal device and the network device for the foregoing four signal structures.

S120. The terminal device sends the uplink signal to a network device.

S130. The network device detects a first signal in the uplink signal.

S140. The network device receives the uplink signal based on a result of detecting the first signal, and/or responds to the uplink signal based on the result of detecting the first signal.

In an embodiment, if the terminal device determines that the signal structure of the uplink signal is the signal structure 1, the terminal device only needs to perform uplink synchronization.

Specifically, the terminal device determines, based on first mapping relationship information and the signal structure 1, a first signal corresponding to the signal structure 1 from a plurality of signals used for implementing a function of the first signal, and sends the first signal to the network device, that is, the uplink data sent by the terminal device includes only the first signal. In other words, after the network device receives the first signal, the first signal may be used to implicitly inform the network device of a specific uplink transmission signal structure corresponding to the first signal.

The network device may determine, based on the detected first signal and the first mapping relationship, that the signal structure, of the uplink signal, corresponding to the first signal is the signal structure 1, that is, the uplink data includes only the first signal. In this case, the network device determines a synchronization parameter based on the first signal sent by the terminal device, and sends response information to the terminal device, where the response information includes the synchronization parameter.

Optionally, the response information further includes grant information, for example, a time-frequency resource and a modulation and coding scheme, that is to be used by the terminal device for next transmission.

It should be noted that, when finding the first signal, the network device actually does not need to know a specific terminal sending the first signal. The network device only needs to determine, based on the found first signal, a TA corresponding to the first signal, and then deliver the TA. Delivered content includes two parts: information (such as an index) that can identify the found first signal, and the TA corresponding to the first signal. The terminal side may actually receive a plurality of TAs, where each TA is corresponding to one first signal. The terminal only needs to find the TA corresponding to the first signal sent by the terminal.

In this embodiment of this application, to avoid a conflict of first signals between terminal devices, the network device optionally configures one first signal for each terminal device.

Optionally, the first mapping relationship information includes a correspondence between the first signal and the signal structure of the uplink signal, and/or a correspondence between a resource used for transmitting the first signal and the signal structure of the uplink signal.

Figure 3:
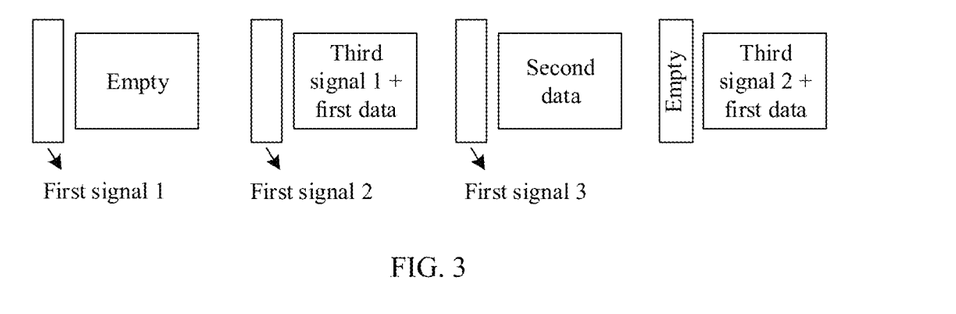
FIG. 3 is a schematic block diagram of indicating a signal structure of an uplink signal by using a first signal according to an embodiment of this application.
Figure 4:
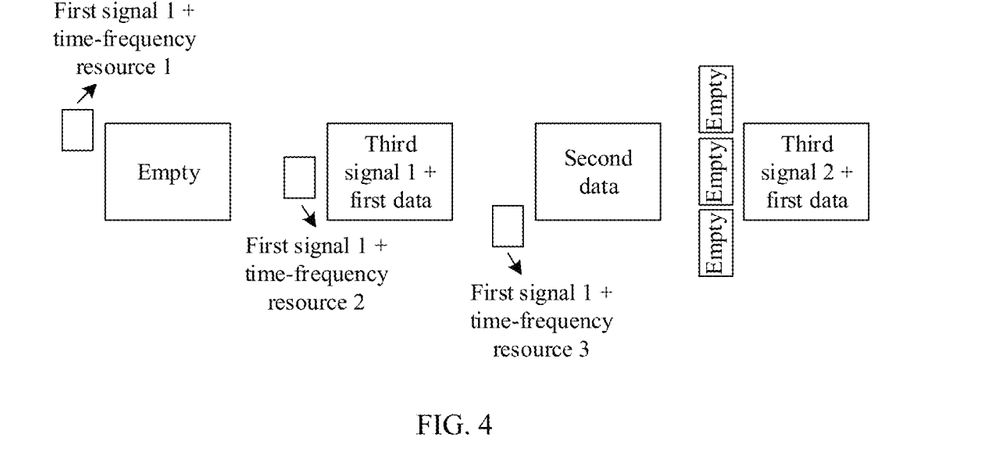
FIG. 4 is a schematic block diagram of indicating a signal structure of an uplink signal by using a resource used for transmitting a first signal according to an embodiment of this application.
Figure 5:
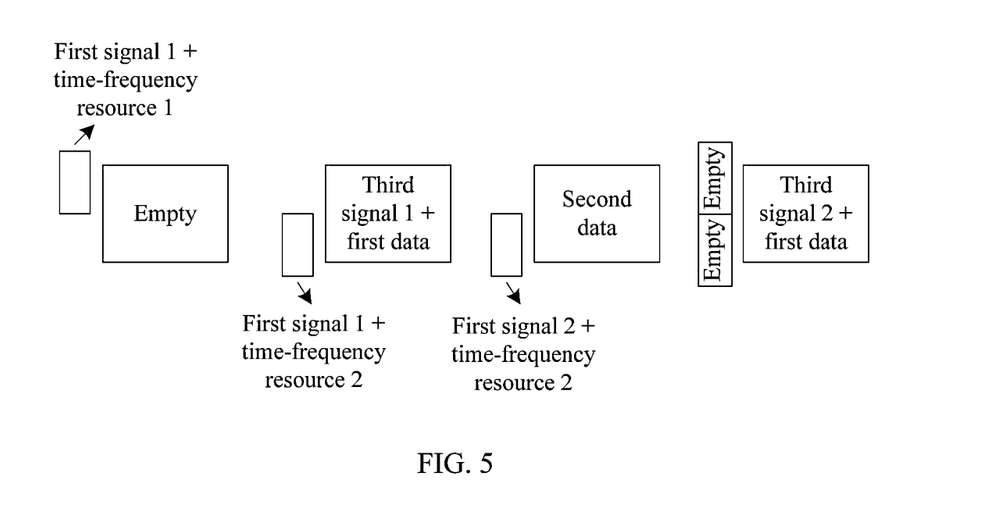
FIG. 5 is a schematic block diagram of indicating a signal structure of an uplink signal by using a first signal and a resource used for transmitting the first signal according to an embodiment of this application.

The following describes in detail the first mapping relationship in this embodiment of this application with reference to FIGS. 3-5.

In an embodiment, the terminal device implicitly indicates the signal structure of the uplink signal by using the first signal.

Specifically, in an embodiment, the network device classifies sequences used to implement the function of the first signal into at least three types: a first type, a second type, and a third type. Each type includes at least one sequence. The network device establishes, in advance, a mapping relationship between the types obtained through classification and a signal structure.

FIG. 3 shows a mapping relationship between a first signal and a structure of an uplink transmission signal according to an embodiment of this application.

Specifically, as shown in FIG. 3, a first signal 1 in a first type is corresponding to a signal structure 1, a first signal 2 in a second type is corresponding to a signal structure 2, a first signal 3 in a third type is corresponding to a signal structure 3, and a signal structure 4 is used when there is no first signal.

To be specific, if the terminal device selects the signal structure 1, the terminal device determines, based on the signal structure 1, that a corresponding type is the first type; selects, as a first signal, one sequence from a sequence in the first type according to a rule, for example, in a random selection manner or another manner; and sends the first signal to the network device. The network device detects the first signal. If finding that the sequence belongs to the first type, the network device may determine, based on a predefined mapping relationship, that a signal structure of an uplink signal of the terminal device is the signal structure 1. In other words, only the first signal is included.

In an embodiment, the terminal device implicitly indicates the signal structure of the uplink signal by using a first resource used for transmitting the first signal.

Specifically, the terminal device implicitly indicates the signal structure of the uplink signal by mapping selected first signals to different time-frequency resources. Optionally, the network device classifies locations of time-frequency resources used for sending first signals, and establishes a correspondence between a time-frequency resource location and a signal structure. For example, the network device classifies the locations of time-frequency resources used for sending the first signals into at least three types: a first type, a second type, and a third type, where the three types of locations of time-frequency resources partially overlap or do not overlap at all; and establishes a mapping relationship between the types obtained through classification and a signal structure.

FIG. 4 shows a mapping relationship between a resource used for transmitting a first signal and a structure of an uplink transmission signal according to an embodiment of this application.

Specifically, as shown in FIG. 4, a time-frequency resource 1, used for transmitting a first signal 1, in a first type is corresponding to a signal structure 1; a time-frequency resource 2, used for transmitting a first signal 1, in a second type is corresponding to a signal structure 2; and a time-frequency resource 3, used for transmitting a first signal 1, in a third type is corresponding to a signal structure 3.

To be specific, if selecting to send the signal structure 1, the first terminal sends the first signal at a first-type time-frequency resource location. The network device detects, at a possible time-frequency resource location, the first signal sent by the terminal device. If finding that the terminal device sends the first signal on a first-type time-frequency resource, the network device may determine, based on the predefined mapping relationship, that a signal structure of an uplink signal of the terminal device is the signal structure 1. In other words, only the first signal is included.

It should be understood that in this embodiment of this application, the terminal device may classify first signals into three types which are used to indicate the signal structure 1, the signal structure 2, and the signal structure 3 respectively; or may establish a one-to-one correspondence between a first signal and a signal structure of an uplink signal. This is not specifically limited in this embodiment of this application.

In an embodiment, as shown in FIG. 5, the terminal device may alternatively indicate a signal structure of an uplink signal by using a first signal and a resource used for transmitting the first signal.

Specifically, as shown in FIG. 5, a time-frequency resource 1 used for transmitting a first signal 1 is corresponding to a signal structure 1; a time-frequency resource 2 used for transmitting a first signal 1 is corresponding to a signal structure 2; and a time-frequency resource 2 used for transmitting a first signal 2 is corresponding to a signal structure 3.

According to the data transmission method in this embodiment of this application, before demodulating data, the network device can determine the signal structure, used by the terminal device, of the uplink signal, and then use a corresponding receiving method. This resolves a problem of a low delay and excessively high signaling overheads in an eMBB small-packet scenario, an mMTC scenario, and a URLLC scenario.

In another embodiment, if the terminal device determines that the signal structure of the uplink signal is the signal structure 2, the terminal device needs to perform uplink synchronization and send the first data.

Specifically, the terminal device determines, based on the first mapping relationship information and the signal structure 2, the first signal corresponding to the signal structure 2; determines the second signal and the third signal based on a second mapping relationship and the first signal; and sends uplink data to the network device, where the uplink data includes the first signal, the second signal, the third signal, and the first data.

To be specific, after finding the first signal, the network device can determine, based on the first signal and the first mapping relationship information, that the signal structure, of the uplink signal, corresponding to the first signal is the signal structure 2, that is, determine that the uplink data corresponding to the first signal specifically includes the first signal, the second signal, the third signal, and the first data. In this case, the network device determines, based on the second mapping relationship information and the first signal, the second signal and the third signal that are corresponding to the first signal, and demodulates and receives the first data based on the second signal and the third signal.

The network device determines a synchronization parameter based on the first signal, and sends response information to the terminal device. The response information includes the synchronization parameter and feedback information of a result of receiving the first data, for example, information indicating that the first data is correctly received or incorrectly received. Optionally, the response information further includes grant information, for example, a time-frequency resource and a modulation and coding scheme, that is to be used by the terminal device for next transmission.

Optionally, the second mapping relationship information includes a correspondence between the second signal and the first signal, and a correspondence between the first signal and at least one of the third signal, attribute information of the first data, and attribute information of the second data, where the second signal is used to identify the terminal device.

Optionally, the attribute information may include at least one of a cyclic prefix length of an orthogonal frequency division multiplexing OFDM symbol, an OFDM symbol resource, and a modulation and coding scheme MCS.

It should be understood that the attribute information in this embodiment of this application may be alternatively power for sending a signal/data, for example, power for the second data or power for second information. This is not specifically limited in this embodiment of this application.

In this embodiment of this application, to ensure receiving of a signal and data in the out-of-synchronization state, optionally, a relatively long cyclic prefix may be used for sending the second signal, the third signal, the second data, and/or the first data.

In this embodiment of this application, after receiving data, the network device needs to know a terminal sending the data. The second mapping relationship may be established to determine the second signal and/or the third signal in this embodiment of this application. However, this is not limited in this embodiment of this application.

For example, the terminal device may package identification information, such as a unique identifier of the terminal device, into data, and send the identification information as a part of the data to the network device. In this way, after correctly receives the data, the network device can know the terminal device from which the data comes.

In this embodiment of this application, the network device can determine the second signal and the third signal based on the second mapping relationship information, and receive the first data by using the second signal and the third signal. This effectively reduces complexity for the network device, reduces a delay, and improves reliability.

In another embodiment, if the terminal device determines that the signal structure of the uplink signal is the signal structure 3, that is, if the terminal device is in the uplink out-of-synchronization state, the terminal device only needs to send the second data to the network device.

Specifically, the terminal device determines, based on the first mapping relationship information and the signal structure 3, the first signal corresponding to the signal structure 3; determines the second signal based on the second mapping relationship and the first signal; and sends uplink data to the network device, where the uplink data includes the first signal, the second signal, and the second data.

To be specific, after finding the first signal, the network device can determine, based on the first signal and the first mapping relationship information, that the signal structure, of the uplink signal, corresponding to the first signal is the signal structure 3, that is, determine that the uplink data corresponding to the first signal specifically includes the first signal, the second signal, and the second data. In this case, the network device determines, based on the second mapping relationship information and the first signal, the second signal corresponding to the first signal, and receives the second data based on the second signal.

The network device determines a synchronization parameter based on the first signal, and sends response information to the terminal device, where the response information includes the synchronization parameter. Optionally, the response information further includes grant information, for example, a time-frequency resource and a modulation and coding scheme, that is to be used by the terminal device for next transmission.

Optionally, the response message may further include feedback information of the second data. For example, the second data is a scheduling request sequence or signal, and the response message further includes feedback information of the scheduling request sequence or signal.

In this embodiment of this application, the network device can determine the second signal based on the second mapping relationship information, and receive the second data by using the second signal. This effectively reduces complexity for the network device, reduces a delay, and improves reliability.

In another embodiment, if the terminal device determines that the signal structure of the uplink signal is the signal structure 4, that is, if the terminal device is in an uplink connected state, the terminal device only needs to send the first data to the network device.

Specifically, the terminal device determines, based on the first mapping relationship information and the signal structure 4, that the signal structure 4 does not include the first signal; determines the second signal based on the second mapping relationship and the first signal; and sends uplink data to the network device, where the uplink data includes the second signal, the third signal, and the first data.

To be specific, after finding no first signal, the network device can determine, based on the first signal and the first mapping relationship information, that the signal structure of the uplink signal is the signal structure 4, that is, determine that the uplink data specifically includes the second signal, the third signal, and the second data. In this case, the network device determines, based on third mapping relationship information, the second signal and the third signal, and receives the first data based on the second signal and the third signal.

The network device sends response information to the terminal device. The response information includes a result of receiving the first data, for example, the first data is correctly received or incorrectly received. Optionally, the response information further includes grant information, for example, a time-frequency resource and a modulation and coding scheme, that is to be used by the terminal device for next transmission.

Optionally, the third mapping relationship information includes a correspondence between attribute information of the first data, the second signal, and the third signal.

In this embodiment of this application, the network device can determine the second signal based on the third mapping relationship information, and receive the second data by using the second signal. This effectively reduces complexity for the network device, reduces a delay, and improves reliability.

In this embodiment of this application, the terminal device can determine the signal structure of the uplink signal based on the first signal and the first mapping relationship information, and there is also the second mapping relationship information between the signal in the uplink data and the first signal.

In other words, the network device can determine, based on the detected first signal and the first mapping relationship information, the signal structure, of the uplink signal, corresponding to the first signal; and can determine, based on the second mapping relationship information, the second signal and/or the third signal used to receive the data.

In this embodiment of this application, the network device can determine, based on the first mapping relationship information, that the structure of the uplink transmission signal is the signal structure 4, and receive the first data based on the signal structure 4. This effectively reduces complexity for the network device, reduces a delay, and improves reliability.

It should be noted that according to the data transmission method in this embodiment of this application, the network device can receive the uplink data without blind detection, so that a processing procedure is simplified. This can effectively improve data processing efficiency and reduce a delay.

Specifically, if the second signal and the second signal are a same pilot sequence, the network device pre-allocates one pilot to each terminal, and terminal devices are corresponding to different pilots. The network device allocates three preambles (P_i1, P_i2, and P_i3) to the terminal device, where the three preambles are respectively corresponding to the signal structure 1, the signal structure 2, and the signal structure 3. It is assumed that a quantity of the terminal devices is N=5. When a signal structure of an uplink signal of a terminal device 1 is the signal structure 1, a signal structure of an uplink signal of a terminal device 2 is the signal structure 2, a signal structure of an uplink signal of a terminal device 3 is the signal structure 3, a signal structure of an uplink signal of a terminal device 4 is the signal structure 4, and a terminal device 5 does not perform sending.

If finding P_11, the network device determines that the signal structure of the uplink signal of the terminal device 1 is the signal structure 1, and no longer detects R_1. If finding P_22, the network device determines that the signal structure of the uplink signal of the terminal device 2 is the signal structure 2, detects R 2 by using a long cyclic prefix, performs channel estimation, and receives the first data. If finding P_33, the network device determines that the signal structure of the uplink signal of the terminal device 3 is the signal structure 3, detects R_3 by using a long cyclic prefix, detects R 4 and R 5 by using a short cyclic prefix, performs corresponding channel estimation, and receives the first data.

If no first mapping relationship information is established in this embodiment of this application, the network device receives data through blind detection during grant-free transmission. To be specific, the network device needs to first detect, on a time-frequency resource, N TAs by using N preambles, and then attempt to detect N terminal devices by using N pilot sequences. Moreover, the network device does not know cyclic prefixes used by the terminal device for sending another signal and other data that are different from the preambles, and consequently fails in detection and receiving.

In contrast, according to the data transmission method in this embodiment of this application, before receiving data, the network device can determine a specific signal structure sent by the terminal, and then use a corresponding receiving method. This avoids complexity and a reliability risk that are caused by completely blind detection performed by the base station, and implements transmission with a low delay and low signaling overheads in the eMBB small-packet scenario, the mMTC scenario, and the URLLC scenario.

Therefore, based on the first mapping relationship information in this embodiment of this application, the network device can receive the uplink data without blind detection, so that a processing procedure is simplified. This can effectively improve data processing efficiency and reduce a delay.

In this embodiment of this application, before detecting the first signal, the network device may send at least one of the first mapping relationship information, the second mapping relationship information, and the third mapping relationship information to the terminal device.

Figure 6:
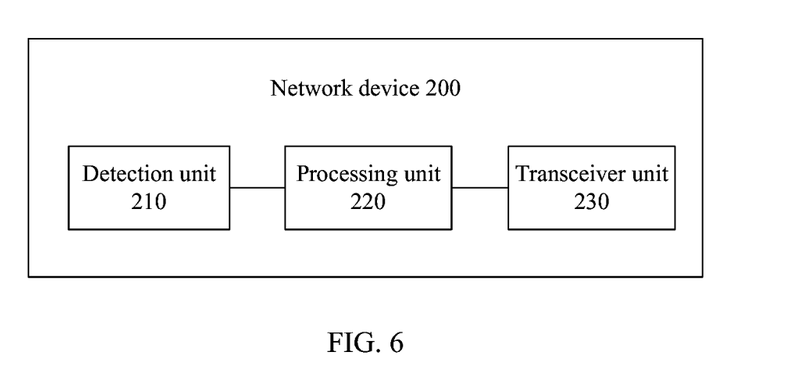
FIG. 6 is a schematic block diagram of a network device for data transmission according to an embodiment of this application.
Figure 9:
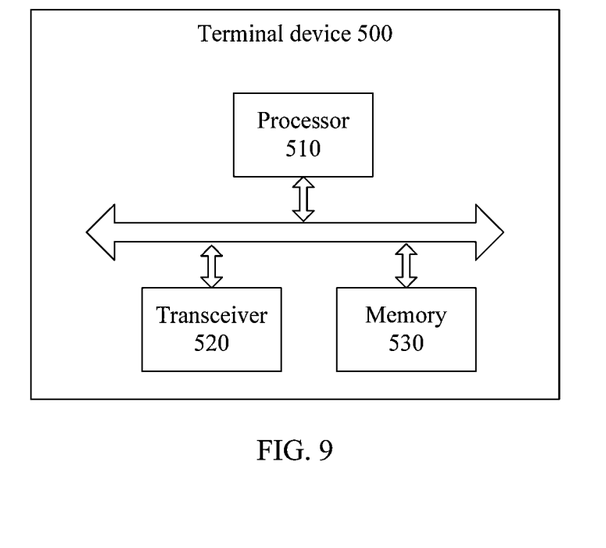
FIG. 9 is another schematic block diagram of a terminal device for data transmission according to an embodiment of this application.

The following describes a network device and a terminal device in the embodiments of this application with reference to FIG. 6 and FIG. 9.

FIG. 6 is a schematic block diagram of a network device for data transmission according to an embodiment of this application. As shown in FIG. 6, the network device in this embodiment of this application includes:

a detection unit 210, configured to detect a first signal in an uplink signal;

a processing unit 220, configured to determine a signal structure of the uplink signal based on a result of detecting the first signal; and a transceiver unit 230, configured to receive the uplink signal based on the signal structure, and/or respond to the uplink signal based on the signal structure.

Optionally, if the network device finds the first signal, the processing unit 220 is specifically configured to determine the signal structure of the uplink signal based on first mapping relationship information and the first signal.

The first mapping relationship information includes a correspondence between the first signal and the signal structure, and/or a correspondence between a resource used for transmitting the first signal and the signal structure.

Optionally, the processing unit 220 is configured to determine, based on the first mapping relationship information and the first signal, that the uplink signal includes only the first signal.

The transceiver unit 230 is configured to send a response message, where the response message includes feedback information of the first signal.

Optionally, the processing unit 220 is configured to determine the terminal device based on second mapping relationship information and the first signal.

The second mapping relationship information includes a correspondence between a second signal and the first signal, and a correspondence between the first signal and at least one of a third signal, attribute information of first data, and attribute information of second data, where the second signal is used to identify the terminal device.

Optionally, the processing unit 220 is configured to determine, based on the first mapping relationship information, the second mapping relationship information, and the first signal, that the uplink signal includes the first signal, the second signal, the third signal, and the first data.

The transceiver unit 230 is configured to: determine the third signal and the attribute information of the first data based on the second mapping relationship information and the first signal; receive the first data based on the second signal, the third signal, and the attribute information of the first data; and send a response message to the terminal device, where the response message includes feedback information of the first signal and feedback information of the first data.

Optionally, the processing unit 220 is configured to determine, based on the first mapping relationship information, the second mapping relationship information, and the first signal, that the uplink signal includes the first signal, the second signal, and the second data.

The transceiver unit 230 is configured to: receive the second data based on the second signal; and send a response message, where the response message includes feedback information of the first signal.

Optionally, the processing unit 220 is configured to: if the detection unit 210 finds no first signal, determine, based on third mapping relationship information, that the uplink signal includes a second signal, a third signal, and first data.

The transceiver unit 230 is configured to: receive the first data based on the second signal and the third signal, and send a response message to the terminal device, where the response message includes feedback information of the first data.

Optionally, the third mapping relationship information includes a correspondence between attribute information of the first data, the second signal, and the third signal.

Optionally, the attribute information includes at least one of a cyclic prefix length of an OFDM symbol, an OFDM symbol resource, and a modulation and coding scheme MCS.

Optionally, the response message further includes uplink grant information of the terminal device.

Optionally, the first signal is used for uplink synchronization between the terminal device and the network device, the second signal is used to identify the terminal device, the third signal is used to estimate an uplink channel between the terminal device and the network device, the first data is application-layer data, and the second data is non-application-layer data.

Optionally, at least two of the first signal, the second signal, the third signal, and the second data are a same sequence or a same signal.

Optionally, before the detection unit 210 detects the first signal, the transceiver unit 230 is further configured to send at least one of the first mapping relationship information, the second mapping relationship information, and the third mapping relationship information to the terminal device.

It should be understood that the network device 200 in this embodiment of this application may correspond to the network device in the method embodiments of this application. In addition, operations and/or functions of the modules and other modules in the network device 200 are intended to implement corresponding procedures of the method 100. For brevity, details are not described herein again.

Figure 7:
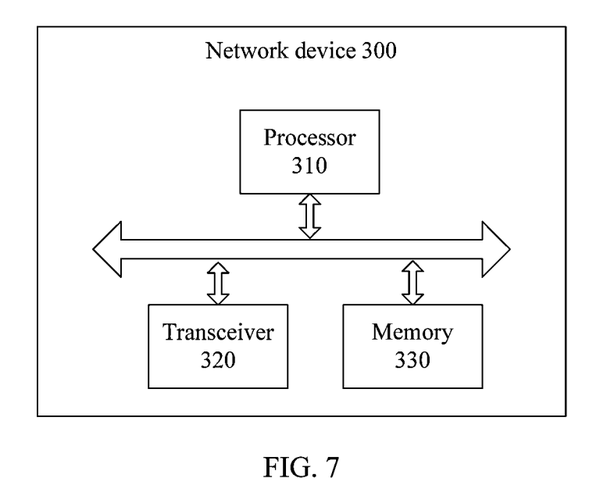
FIG. 7 is another schematic block diagram of a network device for data transmission according to an embodiment of this application.

It should be noted that in this embodiment of this application, the detection unit 210 and the processing unit 220 may be implemented by a processor, and the transceiver unit 230 may be implemented by a transceiver. As shown in FIG. 7, a network device 300 may include a processor 310, a transceiver 320, and a memory 330. The memory 330 may be configured to store indication information, and may be further configured to store code, an instruction, and the like that are to be executed by the processor 310 to perform the processes discussed herein.

The components of the network device 300 are connected by using a bus system. In addition to a data bus, the bus system includes a power bus, a control bus, and a status signal bus.

The network device 300 shown in FIG. 7 or the network device 200 shown in FIG. 6 can implement the processes implemented by the network device in the method embodiment in FIG. 1. To avoid repetition, details are not described herein again.

Figure 8:
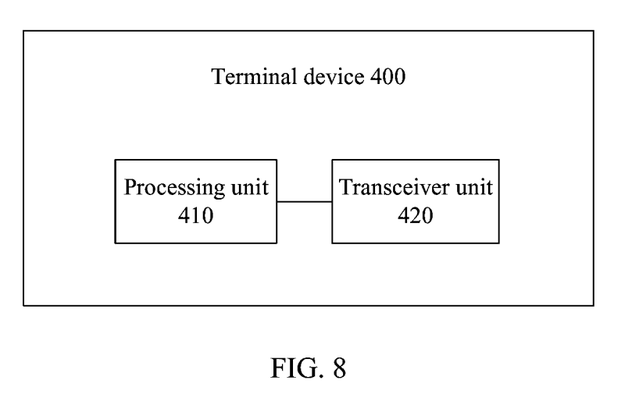
FIG. 8 is a schematic block diagram of a terminal device for data transmission according to an embodiment of this application.

FIG. 8 is a schematic block diagram of a terminal device 400 for data transmission according to an embodiment of this application. As shown in FIG. 8, the terminal device 400 in this embodiment of this application includes:

a processing unit 410, configured to determine a signal structure of an uplink signal based on an uplink status and a type of target data; and a transceiver unit 420, configured to send the uplink signal based on first mapping relationship information and the signal structure of the uplink signal.

Optionally, the first mapping relationship information includes:

a correspondence between a first signal and the signal structure of the uplink signal, and/or a correspondence between a resource used for transmitting the first signal and the signal structure of the uplink signal.

Optionally, the uplink status is an uplink out-of-synchronization state.

Optionally, the target data is empty; and the processing unit 410 is configured to determine, based on the first mapping relationship information, that the uplink signal includes only the first signal.

Optionally, before the transceiver unit sends the uplink signal based on the first mapping relationship information and the signal structure of the uplink signal, the processing unit 410 is further configured to determine a second signal based on second mapping relationship information and the first signal, where the second mapping relationship information includes a correspondence between the second signal and the first signal, and a correspondence between the first signal and at least one of a third signal, attribute information of first data, and attribute information of second data, and the second signal is used to identify the terminal device.

Optionally, the target data is application-layer data; and the processing unit 410 is configured to determine, based on the first mapping relationship information and the second mapping relationship information, that the uplink signal includes the first signal, the second signal, the third signal, and the first data.

Optionally, the target data is non-application-layer data; and the processing unit 410 is configured to determine, based on the first mapping relationship information and the second mapping relationship information, that the uplink signal includes the first signal, the second signal, and the second data.

Optionally, the uplink status is an uplink synchronized state, and the target data is application-layer data; and the processing unit 410 is configured to determine, based on the first mapping relationship information and the third mapping relationship information, that the uplink signal includes a second signal, a third signal, and first data.

Optionally, the third mapping relationship information includes a correspondence between attribute information of the first data, the second signal, and the third signal.

It should be understood that the terminal device 400 in this embodiment of this application may be corresponding to the terminal device in the method embodiment of this application. In addition, operations and/or functions of the modules and other modules in the terminal device 400 are intended to implement corresponding procedures of the method 100. For brevity, details are not described herein again.

It should be noted that in this embodiment of this application, the processing unit 410 may be implemented by a processor, and the transceiver unit 420 may be implemented by a transceiver. As shown in FIG. 9, a terminal device 500 may include a processor 510, a transceiver 520, and a memory 530. The memory 530 may be configured to store indication information, and may be further configured to store code, an instruction, and the like that are to be executed by the processor 510 to perform the processes discussed herein.

The components of the terminal device 500 are connected by using a bus system. In addition to a data bus, the bus system includes a power bus, a control bus, and a status signal bus.

In embodiments implementing the processes discussed herein, the steps of the foregoing methods may be completed using a hardware integrated logic circuit in the processor, or by using an instruction in a form of software. The steps of the methods disclosed with reference to the embodiments of this application may be directly performed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory. The processor executes the instruction in the memory, and completes the steps of the foregoing methods in combination with the hardware in the processor. To avoid repetition, details are not described herein again.

The terms used in the embodiments of this application and the appended claims are only intended to describe specific embodiments, but are not intended to limit this application.

For example, the term "and/or" in the embodiments of this application describes only an association relationship for describing associated objects and represents that three relationships may exist. Specifically, A and/or B may represent the following three cases: Only A exists, both A and B exist, and only B exists. In addition, the character "/" in this specification generally indicates an "or" relationship between associated objects.

For another example, "a", "the", and "the foregoing" in singular forms used in the embodiments of this application and the appended claims are intended to include a plural form, unless other meanings are clearly indicated in a context.

For still another example, terms such as "first", "second", and "third" may be used in the embodiments of this application to describe various messages, requests, and terminals, but the messages, requests, and terminals should not be limited to these terms. These terms are only used to distinguish between the messages, requests, and terminals. For example, a first terminal may also be referred to as a second terminal, and similarly a second terminal may also be referred to as a first terminal, provided that this does not depart from the scope of the embodiments of this application.

For yet another example, depending on a context, a word "if" used herein may be interpreted as "while", "when", "in response to determining", or "in response to detecting". Similarly, depending on a context, phrases "if determining" or "if detecting (a stated condition or event)" may be interpreted as "when determining", "in response to determining", "when detecting (the stated condition or event)", or "in response to detecting (the stated condition or event)".

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for a purpose of ease and brevity of description, for detailed working processes of the foregoing system, apparatus, and unit, reference may be made to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or may be integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the embodiments of this application.

In addition, functional units in the embodiments of this application may be integrated into one processing unit, or each of the units may exist alone physically, or at least two units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A data transmission method performed by a communication apparatus, wherein the method comprises:
    determining a signal structure of an uplink signal is a first signal structure or a second signal structure when the communication apparatus is in an out-of-synchronization state and a first data is to be sent, wherein the first signal structure comprises a first random access preamble sequence, wherein the second signal structure comprises a second random access preamble sequence, a pilot sequence and the first data, and wherein a first time-frequency domain resource for transmitting the second random access preamble sequence and a second time-frequency domain resource for transmitting the first data are inconsecutive in a time domain;
    determining the signal structure of the uplink signal is a third signal structure when the communication apparatus is in a synchronization state and the first data is to be sent, wherein the third signal structure comprises the pilot sequence and the first data; and
    sending the uplink signal based on the signal structure of the uplink signal.

2. The method according to claim 1, wherein the first data is a payload that can be demodulated and received by a network device after the network device performs channel estimation by using the pilot sequence.

3. The method according to claim 1, wherein the synchronization state is determined based on whether a timer times out.

4. A communication apparatus for transmission of a first data, comprising:
    at least one processor configured with processor-executable instructions to perform operations comprising:
        determining a signal structure of an uplink signal is a first signal structure or a second signal structure when the communication apparatus is in an out-of-synchronization state and a first data is to be sent, wherein the first signal structure comprises a first random access preamble sequence, wherein the second signal structure comprises a second random access preamble sequence, a pilot sequence and the first data, and wherein a first time-frequency domain resource for transmitting the second random access preamble sequence and a second time-frequency domain resource for transmitting the first data are inconsecutive in a time domain;
        determining the signal structure of the uplink signal is a third signal structure when the communication apparatus is in a synchronization state and the first data is to be sent, wherein the third signal structure comprises the pilot sequence and the first data; and
        sending the uplink signal based on the signal structure of the uplink signal.

5. The communication apparatus according to claim 4, wherein the first data is a payload that can be demodulated and received by a network device after the network device performs channel estimation by using the pilot sequence.

6. The communication apparatus according to claim 4, wherein the synchronization state is determined based on whether a timer times out.

7. A non-transitory computer storage medium, storing computer instructions that, when executed by a communication apparatus, cause the communication apparatus to perform operations, comprising:
    determining a signal structure of an uplink signal is a first signal structure or a second signal structure when the communication apparatus is in an out-of-synchronization state and a first data is to be sent, wherein the first signal structure comprises a first random access preamble sequence, wherein the second signal structure comprises a second random access preamble sequence, a pilot sequence and the first data, and wherein a first time-frequency domain resource for transmitting the second random access preamble sequence and a second time-frequency domain resource for transmitting the first data are inconsecutive in a time domain;

determining the signal structure of the uplink signal is a third signal structure when the communication apparatus is in a synchronization state and the first data is to be sent, wherein the third signal structure comprises the pilot sequence and the first data; and sending the uplink signal based on the signal structure of the uplink signal.

8. The medium according to claim 7, wherein the first data is a payload that can be demodulated and received by a network device after the network device performs channel estimation by using the pilot sequence.

9. The medium according to claim 7, wherein the synchronization state is determined based on whether a timer times out.

* * * * *